INVENTORS
HAROLD OSTERBERG
LUTHER W. SMITH
JULIUS KANE

BY
ATTORNEY

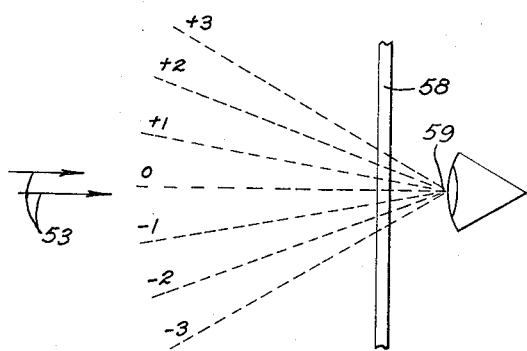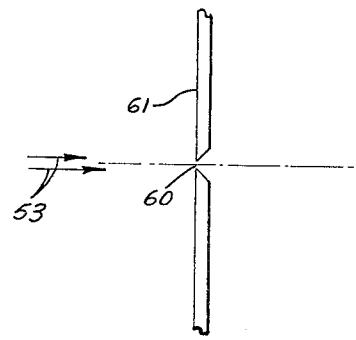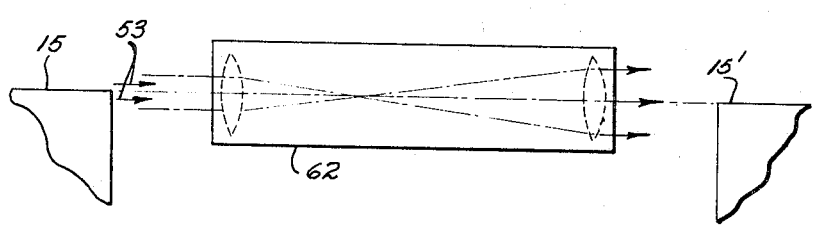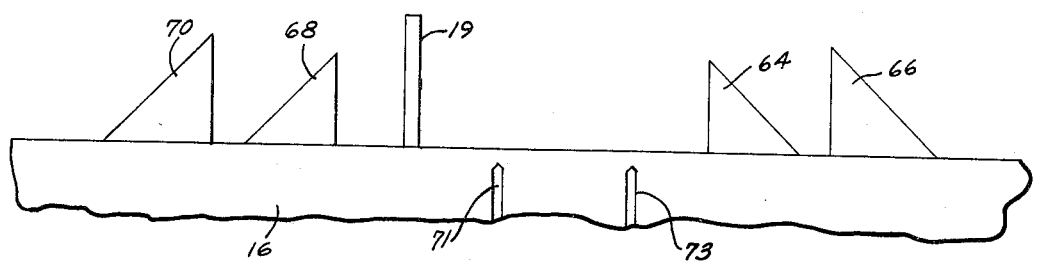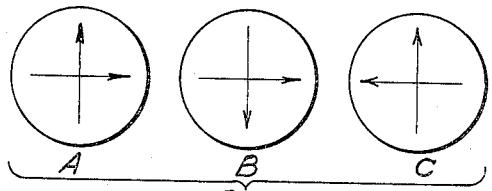

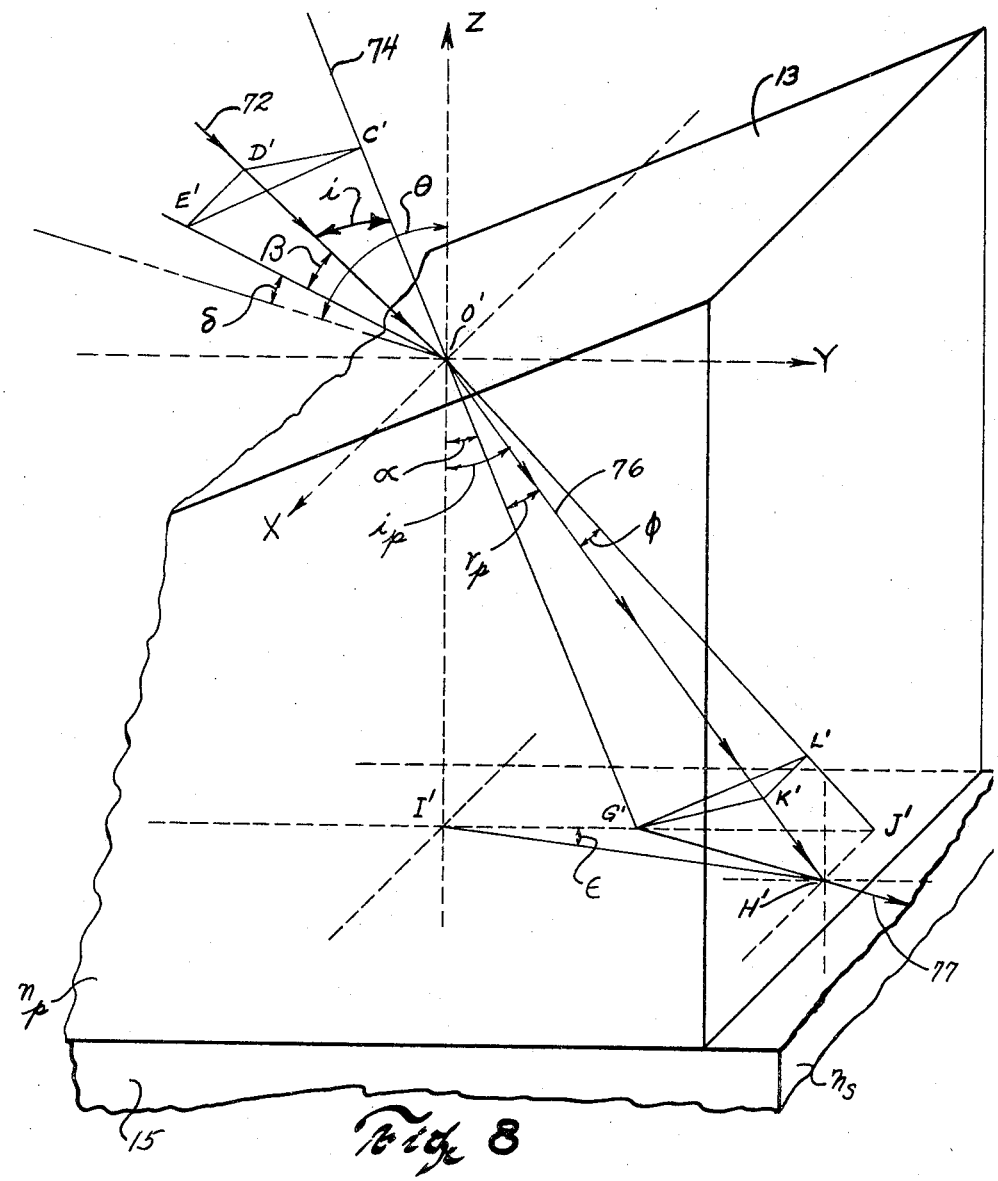

3,489,481
APPARATUS FOR LAUNCHING TRANSMITTING AND RECEIVING TWO-DIMENSIONAL OPTICAL IMAGES BY MEANS OF SURFACE-GUIDED OPTICAL WAVES
Harold Osterberg, Sturbridge, and Luther W. Smith, Southbridge, Mass., and Julius Kane, Peace Dale, R.I., assignors to American Optical Company, Southbridge, Mass., a corporation of Delaware
Continuation-in-part of application Ser. No. 255,493, Feb. 1, 1963. This application Mar. 17, 1964, Ser. No. 352,434
Int. Cl. G02b *17/00, 23/02*
U.S. Cl. 350—49          4 Claims

ABSTRACT OF THE DISCLOSURE

Apparatus for launching guiding and receiving two-dimensional optical images by surface-guided optical waves over considerable distances without appreciable attenuation and even though the guide surface therefor may be appreciably twisted or curved at intermediate locations.

---

This application is a continuation-in-part of co-pending application Ser. No. 255,493, filed Feb. 1, 1963, now abandoned.

This invention relates to improvements in optical means and method for transmitting and receiving two-dimensional optical images and the like. More particularly, the invention relates to means and methods for transmitting and receiving such optical images including optical components and associated structure for launching, guiding, and receiving optical energy in the form of what may be called "surface-guided optical waves" in such a manner as to form optical images in a new and different way than has been possible heretofore.

In said co-pending application Ser. No. 255,493, means for transmitting and receiving optical energy by means of surface-guided optical waves has been described. In said earlier application, it has been disclosed that such surface guided optical energy, when once properly launched along a suitably prepared optical guiding surface, have the peculiar characteristics of tenaciously hugging and closely following such a surface whether this guide surface is formed on a flat plate or strip of material which is slightly curved or twisted in order to bypass obstacles or the like in extending from the launching location to a receiving location appreciably spaced therefrom without having the surface-guided optical waves appreciably attenuated or deteriorated.

It has now been found that, by the use of suitable means and optical components and method disclosed herein, sharply defined two-dimensional optical images at high image resolution can be transmitted from one location to another by means of surface-guided optical waves and even caused to be propagated across open-air spaces or travel through transparent liquids and solids on their way to the receiving location without material attenuation of the optical energy and without material deterioration of definition of the optical image being transported.

Because these surface-guided optical waves stay close to their guiding surface while travelling from one location to another, they are very conservative as to the thickness and width of the guiding strip or plate required therefor. Thus, a suitably prepared elongated ribbon-like band or strip of transparent material of suitable optical properties may be conveniently used as guide means between materially spaced sending and receiving locations and may even transmit across air gaps in the ribbon-like guide means as long as the guide means at opposite sides of the gap are optically aligned with each other. Furthermore, these images are free from graininess or the like of the type commonly experienced when using fiber optical bundles for conducting two-dimensional optical images from one location to another. Also, because of the peculiar characteristics and behavior of the surface-guided optical waves, it is possible, by means to be hereinafter disclosed, to transmit a single two-dimensional image to a plurality of receiving locations simultaneously, and conversely possible to employ a plurality of different suitably arranged launching prisms for simultaneously sending a like number of optical images along a single guiding surface to one or a plurality of receiving locations.

It is interesting to note that these surface-guided optical waves in the improved optical system of the present disclosure do not behave in the usual and expected manner of conventional light rays. Nor are the optical images formed thereby of usual kind. Instead, as will be more fully explained hereinafter, the optical energy and the optical images being propagated by the structure of the present invention are directly and primarily dependent upon the refractive and the dispersive characteristics of the launching, guiding, and receiving components of the optical system being used and this optical energy and optical images behave in new and unexpected ways.

For instance, the magnification of the transmitted image is not produced and controlled in a conventional manner. Instead, while a sharply defined optical image of an object such as a picture on photographic film disposed at a film gate of the system may be launched along the surface of the guide strip associated therewith and even projected across open-air spaces or the like before being received by the associated receiving means in such a way as to reproduce the image at an image plane of the system at unit magnification, nevertheless, the insertion of a relay telescope, for example, of a 2:1 magnification in the said air spaces of the system will not provide an overall 2:1 magnification in the final image; as is more fully explained hereinafter.

In somewhat similar manner, if a dove prism is disposed in usual fashion in this air gap or space in the system so as to intercept the projected optical beam and is then rotated in the usual manner to rotate the image, the image being produced by the optical system of the present invention will not be rotated in the usual and expected manner. Instead, when the internal reflecting face of the prism is disposed parallel to the plane of the sheet-like projected beam impinging upon the prism, the final image will be the same as when the dove prism is omitted. However, if the dove prism is positioned so as to have its reflecting surface disposed perpendicularly relative to the plane of said sheet-like projected beam, the final image will be inverted, that is reversed side-for-side. However, rotation of this prism through 90° from one of these positions to the other will not rotate the image in usual fashion; instead there will be a temporary blurring of the image at positions in between.

When the projected beam in the gap or free air space between parts of the surface-guiding structure is considered, it will be found that the light thereof is in the form of a sheet-like pattern of radiation which is being end-fired into the air gap and when later received by second aligned surface-guiding means, it will reinduce therein surface-guided waves which, in like manner, closely and tenaciously hug the surface of the second surface guiding means and may thereafter be "picked off" by a receiving prism of suitable optical characteristics positioned in optical contact with the guide means and arranged along the optical path of the system and optical images formed thereof as before.

It is also possible to employ a plurality of suitably positioned launching prisms aligned, one after the other, so as to simultaneously launch different optical images along a single guide strip and such may be used to provide superimposed images. In somewhat similar manner, it is possible to simultaneously use a plurality of receiving prisms aligned, one after another, in optical contact with the guide strip when desired for receiving images at a plurality of locations. In fact, the launching prisms may be of somewhat different dispersion properties and this will give superimposed images of different vertical dimensions. Even the alignment of different launching prisms can be slightly different so as to provide "doubled images" when desired.

It is, accordingly, a principal object of the present invention to provide a structure including optical components of related special character whereby a two-dimensional optical image or optical images, such as pictures from photographic film, or the like, may be transmitted separately or simultaneously by use of surface-guided optical waves from one or a plurality of sending locations to different receiving location or locations spaced materially therefrom.

It is also an object of the invention to provide novel structure whereby a sharply defined optical image may be transmitted by surface-guided optical waves to a plurality of receiving locations at the same time, and which received images may be of the same or of different magnifications considered in the vertical direction thereof.

It is a further object of the present invention to provide a method and means including optical components of the character described whereby a plurality of sharply defined optical images of different objects may be simultaneously transmitted along guide means from first separate aligned sending locations to a receiving location spaced therefrom.

Other objects and advantages of the invention will become apparent from the detailed description which follows when taken in conjunction with the accompanying drawing wherein:

FIG. 4 is a sketch showing a diffraction grating for use in explaining the invention;

FIGS. 5 and 6 are illustrations showing respectively slit means and telescopic means within the optical system of the present invention for use in explaining principles of operation thereof;

FIG. 7 is a diagrammatic showing of prisms which may be used in carrying out the invention;

FIG. 8 is a perspective diagram for use in analyzing the optical conditions and characteristics encountered in the propagation of surface-guided optical waves; and FIG. 9 is a sketch showing three different image orientations and arrangements at different selected locations in the optical system of FIG. 1.

Figure 1:
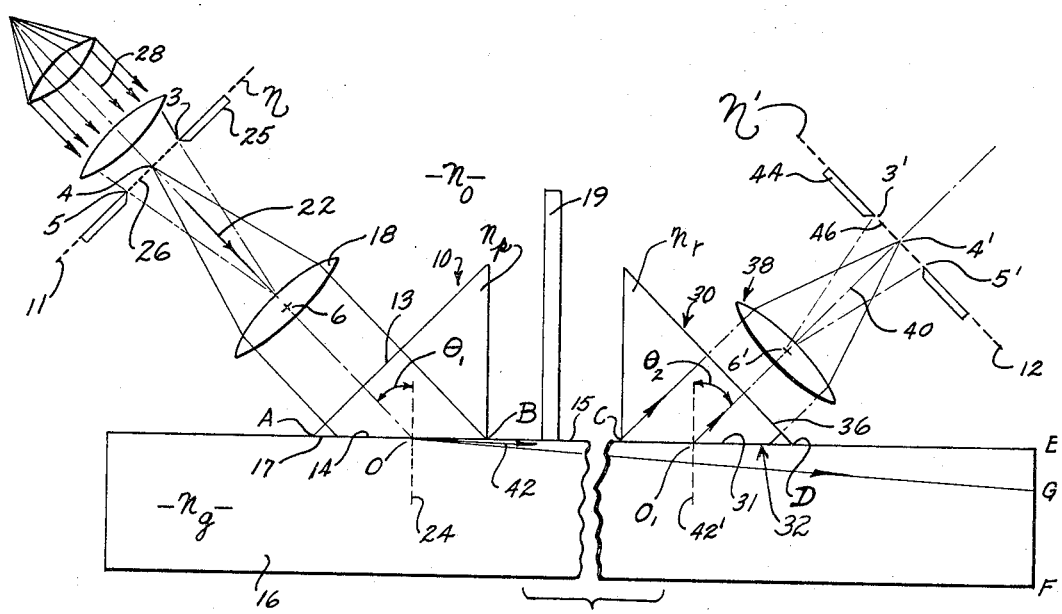
FIG. 1 is a diagrammatic side elevational view of structural and optical means for use in explaining principles of operation of the invention.
Figure 2:
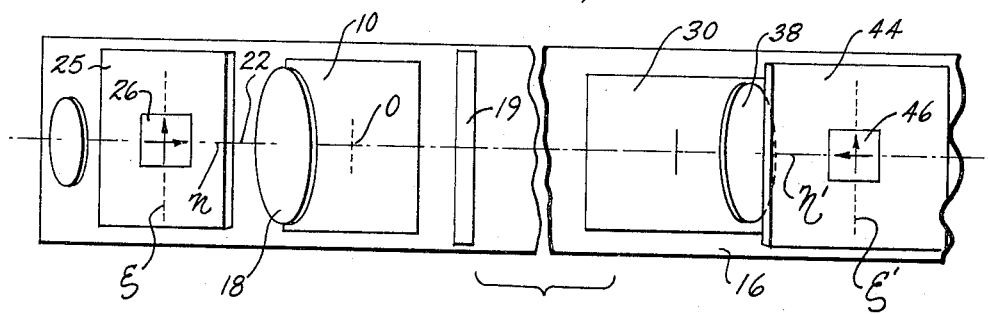
FIG. 2 is a plan view of the structure of FIG. 1.

Referring to the drawings in detail and in particular to FIGS. 1 and 2, it will be seen that a transparent dispersion prism of relatively high refraction index $n_p$ is indicated generally by the numeral 10. This prism is arranged to serve as launching means for optical energy in the form of surface-guided waves being used to transmit an optical image from an object plane 11 to an image plane 12 spaced materially therefrom. This prism 10 has an entrance surface 13 and an exit surface 14 which are so disposed relative to each other as to have, adjacent the corner A, an included prism angle which is nearly equal to the critical angle for this prism at its interface when in optical contact with a supporting plate 16.

Exit surface 14 is shown positioned upon a suitably prepared flat upper surface 15 of the supporting guide plate, or substrate 16 which has a relatively low refractive index $n_g$. Preferably complete optical contact at the interface 17 between these two surfaces is insured by an immersion oil, cement or the like of higher refractive index than the plate; and it should be noted that the critical angle mentioned above will depend directly upon the refractive indices of this interface. In order to have surface 15 of plate 16 of suitable character to conduct these surface-guided waves, it has been found that this plate should have a good optical finish and a gradient in refractive indices with its highest index at the exterior surface 15 and lower refractive indices inwardly thereof. An opaque block is indicated at 19. This block need not always be present as indicated but does show that the optical waves are travelling within rather than along guide surface 15.

The entrance surface 13 of prism 10 is preceded by a collimating lens 18 aligned therewith. An object plane 11 is disposed at the first principal focus of lens 18. The collimator lens 18 would be arranged for suitable angular and sidewise adjustment so that it can be rotated into such a position as to direct the axial ray 22 from this lens into the prism 10 so as to be within the prism at an angle $\theta_1$, which is slightly below the critical angle for total internal reflection at point 0 in the interface 17. It is important to have this structure arranged so that slight vernier adjustment of angle $\theta_1$ can be made conveniently. Also, the collimator will be positioned so that point 0 falls approximately midway between lower prism corners A and B.

It is preferable to use at 10 a prism which has such an angular value at A that axial ray 22 will be incident thereon substantially at right angles to entrance face 13. Thus, the angle A between faces 13 and 14 will be near the critical angle for the total internal reflection at point 0 and sin A will be approximately equal to $n_g/n_p$.

As indicated at 25, a film gate is located at the object plane 11 and has an aperture 26 therein which serves to define an object area of suitable height and width for the system. A beam of white light for illuminating photographic film or the like at aperture 26 is indicated at 28 and preferably this light will be directed through the aperture 26 in such a manner as to fully illuminate the aperture while being focused, as indicated in FIG. 1 at the plane of collimating lens 18. Of course, the light source for supplying beam 28 can be of any conventional type as long as its image is capable of fully lighting collimating lens 18.

In fact, it would even be possible, if desired, by use of suitable optical means of known type, such as photomicrographic projection means, or the like to provide an aerial image at the plane of the aperture 26 (instead of photographic film) and at the same time to have the light rays thereof so directed as to pass through collimating lens 18 and then through the system and form an image at the image plane 12.

A receiving prism 30 is disposed upon the guiding surface 15 of the plate 16 at a convenient distance from but in line with the launching prism 10 and preferably this prism 30 has a refractive index, $n_r$, a prism angle and dispersion characteristics like that of prism 10. Thus, the entrance face 31 of this receiving prism and upper surface 15 of the plate 16 serve to form a second optical interface 32 therebetween and a high index immersion oil or optical cement is used therebetween to insure complete optical contact.

The exit surface of prism 30 is indicated at 36 and a telescope lens 38 is shown adjacent thereto and in such relation to the image plane 12 as to have its second principal focus 4' located at this image plane. The optical axis of the telescope lens is indicated at 40. The alignment of this axis 40 with respect to point $0_1$ in the face 31 of prism 30 can be understood from the following considerations. When the collimator is in proper adjustment, a light ray from the midpoint 4 of the aperture 26 is incident at 0 slightly below the critical angle and is refracted into plate 16 at an angle near the grazing angle as indicated by arrow 42. If the refractive index is higher at surface 15 than in the interior portion of plate 16, then a ray refracted along a direction 42 sufficiently near grazing incidence will be deviated by further refraction in the gradient of refractive index just below surface 15 such that this ray will be returned to the surface 15. When this ray returns to surface 15 at points between prism corners B and C, total reflection occurs because the material above the surface 15 is air and its refractive index $n_o$ is less than $n_g$ at the surface of the plate 16. In this manner, the near-grazing ray entering plate 16 becomes trapped at the surface 15 between B and C and cannot escape until reaching the receiving prism 30 where the refractive index relation $n_r > n_g$ exists.

If prism 30 is contacted to surface 15 by an immersion oil having a refractive index greater than $n_g$, then because the grazing ray trapped in the plate 16 between B and C must remain in the near-grazing condition, it can be refracted into prism 30 at an angle $\theta_2$ near the critical angle of prism 30 with respect to plate 16. In this manner, a ray from point 4 in the aperture 26 can reach point $0_1$ and be refracted along the arrow direction indicated making angle $\theta_2$ with the normal 42′. The preferred included angle near corner D between the prism faces 31 and 36 falls near the critical angle so that sin D substantially equals $n_g/n_r$.

Under these preferred conditions, the axis 40 of the telescope will be pointed so as to intersect surface 31 at point $0_1$ and rays from point 4 in aperture 26 will reappear at the corresponding image point 4′ located on or near the optical axis 40 in the image plane 12, which coincides with the rear focal plane of the telescope 38.

Whereas the above said gradient of refractive index in plate 16 causes a ray refracted along 42 to hug the guide surface, reflection from the lower face of a suitable stratum, for example a homogeneous thin film having refractive index $n_f > n_g$, as suggested in one modified construction in said earlier filed application, can also cause said ray to hug the guide surface, and such means fall within the spirit and teachings of the present invention.

It is noted that a ray entering plate 16 at point 0 need not necessarily be refracted precisely along a particular grazing direction 42 in order to cause optical power transmission along this direction 42. Actually, when all points in the prism surface between A and B are considered, and all will contribute rays like ray 42, the projection of face A.B. upon a plane perpendicular to the arrow direction 42 will resemble a very narrow illuminated slit. This imaginary narrow slit, it has been found, can be considered as capable of deviating by diffraction a considerable amount of power along the given arrow direction 42 from refracted rays that enter plate 16 along directions that are not quite parallel to direction 42. Considerations of this type reveal the complexity of transmitting images by way of surface-guided optical energy and show that the principles of physical optics must be invoked when attempting to interpret this optical image transmission phenomena.

A method of adjusting the system for observing the image of printed matter placed at the film gate 26 is as follows: In order to transmit the entire image of the aperture which extends from point 3 to point 5, the aperture must be illuminated by white light. Suppose that the collimator 18 is initially at an angle of incidence, $\theta_1$ which is small. As the collimator is tilted downwardly so as to increase $\theta_1$, refracted rays such as OG appear on the end face EF of plate 16 and these refracted rays form a spectrum about point G. This spectrum, as expected, will be bluish at points in a direction toward E and reddish for points in a direction toward F. As $\theta_1$ is increased further, the bluish portion can be made to extend up to point E along the grazing direction from O to E.

Upon looking into the telescope 38, printed matter located near 5 in aperture 26 will be seen imaged in bluish light at the image plane 12. As the collimator is rotated downward to increase $\theta_1$ further, the yellowish portion of the spectrum at the end face EF appears at E. At this stage, the field of view seen at 12 is larger. The bluish letters have moved in the direction 5′ to 4′ and yellowish letters corresponding to the image of the printed letters near 5 in the object appear at the lower, illuminated portion of the image 12. Unless the object film is too long in the direction 5 to 3, it will be possible to image at 12 the whole height of the printed matter located at 26 by tilting the collimator downward to increase $\theta_1$ to the point at which the reddish portion of the spectrum at EF has moved to the grazing position E. Upon looking in the telescope, one is likely to see the entire image formed of the printed matter within 26 at the image plane 12.

In case an aperture 44 is included at the image plane of the telescope, this aperture must be large enough to accept the image. The telescope must be pointed so that the image is centered at 4′, as will be the case when the optical axis 40 of the telescope is directed at point $0_1$ in the manner already described. If the telescope has a field of view as large as or exceeding that of the collimator, the image seen at 12 will contain bluish letters at 3′, yellowish letters at 4′ and reddish letters at 5′ corresponding to points 3, 4 and 5, respectively in the object. A considerable degree of choice of distribution of color in the direction 3′ to 5′ is available by adjustment of the tilt of the collimator.

The dimension of height along the direction 3′ to 5′ owes its existence to the wavelength or frequency spread of the incident light beam, i.e., the coordinate of height is obtained by way of a frequency variation. In this respect, the image thus produced at 12 is distinctly different from those produced by the usual methods of image transfer from one location to another as, for example, with slide projectors. On the other hand, the lateral dimension in the direction at right angles to 3′–5′ direction and perpendicular to the plane of the drawing is formed according to the usual laws of geometrical optics.

The manner in which the image along the coordinate of height is formed can be understood by considering the images formed of slits acting as the object. Suppose that a single, exceedingly narrow slit is located in the aperture 26 and oriented with its length along the lateral direction of the optical system (that is perpendicular to the plane of the drawing of FIG. 1). Consider first the case in which the slit is illuminated by monochromatic light. Upon tilting the collimator so that the blurred monochromatic spectrum is seen near E, a sharp spectral line will be seen in the image plane 12. This spectral line is the monochromatic image of the slit. The following properties of said spectral line are important to the principles of image formation by surface-guided optical energy:

(1) The height of the spectral line along the height coordinate 3′ to 5′ is exceedingly narrow and corresponds to the resolving power of the combined clear aperture of the telescope objective and prism 30, i.e. the image of the spectral line has a sharpness limited by the effective aperture of the telescope.

(2) The spectral line reaches maximum intensity at a particular angle of incidence $\theta_1$ and this intensity drops exceedingly sharply as $\theta_1$ is altered from said maximizing angle of incidence.

(3) The sharpness of the spectral line is practically independent of the slit height along 3 to 5; i.e. as the object slit is opened, the sharpness of the monochromatic spectral line remains practically unchanged. In other words, with monochromatic illumination, the image of a wide or narrow slit remains substantially unchanged and with a sharpness restricted only by the resolving power associated with the clear aperture of the combined telescope and receiving prism 30 being used.

The basic fact emphasized by the properties mentioned in sections (1)–(3) is that for a given incident wavelength λ at the aperture 26, mainly those rays that are incident sharply at the maximizing angle $\theta_{1, max}(\lambda)$ of incidence are selected by the surface-guiding mechanism for transmission of the optical flux, $F(\lambda)$, from prism 10 to prism 30. Consequently, with monochromatic radiation, only one line perpendicular to the direction 3–5 in the aperture 26 enjoys the privilege of radiating power that succeeds in reaching the image plane 12.

Additionally, a fourth property which is considered important is that whether a very narrow object slit in aperture 26 is illuminated by monochromatic or white light, for a given location of the slit and for a given angularity of the collimator only one, sharp spectral-like line appears in the image plane 12.

Exceptions to the above-mentioned four points occur commonly in systems that permit image doubling. Such doubling can result from a wedge effect of appreciable value in the immersion oil underneath prism 30 or from the tendency of some surface wave guides to support the propagation of more than one mode. Properties in sections (1)–(4) imply that, except for surface wave guides that can support more than one mode, of a family of rays incident at the same angle $\theta_1$ in the launching prism 10 only those rays belonging to the particular wavelength $\lambda$ for which $\theta_1 = \theta_{1, \text{max}}(\lambda)$ succeed in exciting in plate 16 an appreciable flow of power along surface 15 thereof from prism 10 to the receiving prism 30. In conclusion, surface 15 acting as a wave guide is highly selective in its power transmittance as regards both wavelength and angle of incidence. This selective property is a very material factor in the transmission of sharp optical images from the object plane 11 to the image plane 12.

It is pointed out that when the object plane is being illuminated with white light and collimating lens 18 is focused upon this object plane, bundles of parallel light rays will be incident at interface 17 each of which bundles is parallel to a different one of the light rays included within the "cone" of light rays indicated by the angle 3–6–5; and wherein 3 and 5 are upper and lower points in the aperture 26 and point 6 is at the center of lens 18.

However, all of the surface-guided optical waves resulting therefrom move substantially in the launching direction OE; but, as will appear hereinafter, there will be small variations therebetween and these variations are of such small magnitudes as to be well within the limits set by angle 3–6–5. These variations are rendered possible because of the inherent refraction and dispersion characteristics of the launching prism 10 at critical angle for the wavelengths involved. Thus, as an example, it will be seen that blue light rays from object point 3, yellow light rays from object point 4 and red light rays from object point 5 will be refracted different amounts while being directed substantially along line OE.

Thereafter, these rays, as they reach receiving prism 30 will be refracted into prism 30 at or near critical $\theta_2$ for the wavelengths involved and so as to pass through points 3', 4' and 5' respectively. Accordingly, if a photographic film having printed matter thereon is placed at film gate 25, an image of this printed matter will be formed at the framing aperture 46 at image plane 12 and those portions of the printed matter imaged at point 3' will appear blue and those portions at 5' will appear red and a dispersion of colors will appear therebetween. However, this image will be extremely sharp and its sharpness will be comparable to the image quality obtainable by the best of conventional telescopes.

Provided that prisms 10 and 30 are identical and provided that the focal lengths of the collimator and telescope are the same so that the optical system has symmetry, the magnification ratio of the image is unity. Images produced with the aid of surface-guided optical energy differ conspicuously from images produced by conventional optical methods not only in the respect that the height coordinate owes its existence to a wavelength spectrum but also in the respect that the magnification ratio of the height coordinate is in general different from that of the lateral coordinate.

Indeed, experiments show that the image height (as it appears between 3' and 5') depends upon dispersion of color as provided by the optical components involved. Thus, if the film is now illuminated by monochromatic light, only a transverse line image will appear at image plane 12 and this line in the structural arrangement in FIG. 1 will be perpendicular to the plane of the paper. The maximum height of the field of view which can be obtained at image plane 12 (as measured between 3' and 5') will depend upon the full spectrum height which can be developed at this location. On the other hand, the maximum width of field of view which can be obtained and the image quality in the same direction will depend upon the usual laws of geometrical optics and the width of launching and receiving prisms used.

Thus, the image magnification $M_h$ considered in the vertical or height direction and the image magnification $M_w$ in the transverse or width direction follow different optical principles and can be altered independently. The image magnification in the horizontal direction can be simply stated as $$M_w = \frac{\text{focal length of telescope}}{\text{focal length of collimator}}$$

The image magnification in the vertical direction, however, is not as easily algebraically stated, and, from experiments, it has been found to be a function which increases with increase in the ratio of the dispersion of the receiving prism to the dispersion of the launching prism.

Figure 3:
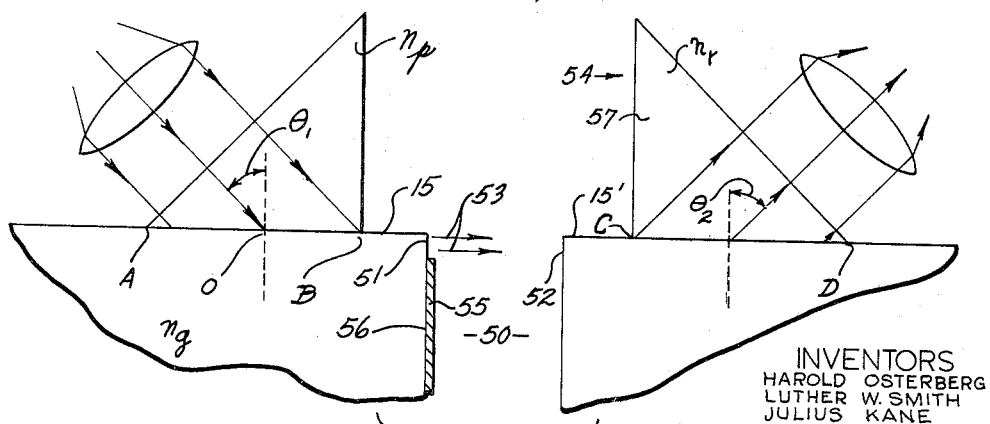
FIG. 3 is a diagrammatic showing of a modified structure for use in explaining principles of operation of the invention.

In FIG. 3, there is shown a structure somewhat like that in FIG. 1 but wherein an air gap 50 of appreciable size is provided between a polished end surface 51 of a launching prism and guide plate combination having the guide surface 15 thereon and the polished end surface 52 of an aligned receiving guide plate and prism combination 54. In such an arrangement, it has been found that the surface-guided waves will be "end-fired," as indicated by arrows 53, into the air gap 50 when they reach surface 51 and same will travel in a very thin sheet-like pattern of radiation and will enter the receiving combination 54 and reinduce therein surface-guided waves which hug the guide surface 15' and pass into the receiving prism 57 in the same manner as in FIG. 1. While the physical phenomena or behavior of the light rays travelling through air gap 50 is not fully understood, nevertheless, it has been found that this light retains its image-forming content, enters the second guide plate or substrate and follows surface 15' and thereafter emerges out through the receiving prism and forms an image of the object as already described relative to FIG. 1.

An opaque member 55 is shown against a roughened area 56 of the launching end face to absorb all internal light except that travelling near surface 15. Also, the bottom surface (not shown) of this guide plate or strip can be similarly treated for light absorption.

As stated previously, the surface-guided waves will tenaciously hug the guide surface when this surface is of suitable character. It can be shown with mathematical prediction that these waves having appropriate wavelengths can be propagated in discrete modes when the integral guiding plate has a homogeneous surface layer of refractive index higher than the value $n_g$ of the interior region of the plate. As the optical path of a homogeneous layer in such a guide plate increases, the number of allowable discrete modes increases and these modes, of course, differ as regards the angle of incidence at which each mode propagates. Therefore, if the inhomogeneity or gradient of the refractive index inwardly from the exposed guide surface is too great, one can expect too many discrete modes will be propagated and undesired "image doubling" or blurring will occur at sufficient power to be detected. This expectation is reasonable in view of the close analogy that exists between homogeneous and inhomogeneous layers acting as physical agents for transporting surface-guided optical energy.

It should not be imagined that the receiving prism 30, FIG. 1, simply reverses what has already happened to the surface-guided optical waves prior to reaching the point C and that the light at plane 12 merely appears by sheer symmetry at the rear focal plane of the telescope. On the contrary, the essential features are that the image-carrying beam travelling along the guide surface 15 be subjected to a dispersing action which is such as to counteract the dispersion conditions already introduced into the light waves by the launching prism.

The importance of dispersion of an angle of refraction with wavelength for extracting the wave-borne image is shown by considering the arrangement in FIG. 4 wherein a diffraction grating 58 of about 5000 line per inch was disposed (in place of the receiving guide plate and prism) in the path of the end-fired radiation 53, being produced by launching prism having $n_p$ equal to 1.8 and guide plate having $n_g$ equal to 1.52. One's eye placed as illustrated at 59 will see no image of the film at the film gate aperture 26 when looking along the dotted line marked 0 for zero order diffraction, but will see images in the higher orders on each side of this zero order as indicated by dotted lines +1, +2 and +3 and −1, −2 and −3.

Also, it is interesting to note that the height of the image (formed in color) is magnified as the order number is increased. Thus, one sees a vertical series of images of increasing magnifications above and below the zero line. Since red is deviated most by the grating, red appears at the outer of each image and the images above the zero line will appear upside-down with respect to those seen below the zero line.

Thus, FIG. 4 shows that it is not merely a prism or refraction that is needed to extract the transmitted image from the end-fired beam. Instead, it is the angular dispersion with wavelength that is needed and may be obtained by prism, grating or other means.

When a slit, as indicated at 60 in a plate 61 in FIG. 5 was used in an end-fired beam like that at 53 in FIG. 3, it was found that this slit could be closed down to as little as 0.1 mm. without appreciably altering the resolution of the transmitted image although the level of illumination was lowered. In fact, this slit when properly adjusted was able to "undouble" some of the doubled images produced by the many modes being launched by certain prism and plate launching combinations.

Also, when a conventional dove prism (not shown) was placed in the end-fire beam 53 between the prisms in FIG. 3, the transmitting image could not be rotated in the usual fashion by rotating the dove prism. Instead, when its reflecting face was perpendicular to the plane of the projected sheet-like beam, the transmitted image was reversed from left to right. When this dove prism was at a position 90° to the position mentioned above so that its reflecting face was parallel to the plane of the projected beam 53, the orientation of the image was the same as that when the dove prism was omitted. Also, rotation from one of these positions to the other did not rotate the image but instead merely blurred the image at positions in-between.

In FIG. 6 a telescope 62 is diagrammatically shown in the end-fire beam 53. If the magnification of this telescope is 2 to 1, for instance, the image provided at image aperture 46 will not be magnified in height although it will undergo a left-to-right inversion and will have a 2 to 1 magnification in the lateral direction. It should thus be appreciated that while the transmitted magnified dimensions of the image are due to the inserted intermediate telescope, the height or vertical dimensions thereof are due to dispersion at critical angles. However, if a receiving prism of different refractive and dispersive characteristics were used, a different image height might result.

In FIG. 1, the launching and receiving prisms have been described as being single. However, it has been found that if two or more such receiving prisms such as shown at 64 and 66 in FIG. 7 are used in series upon guide plate 16 (or upon spaced guide plates as suggested in FIG. 3) a plurality of images can be simultaneously transmitted and taken therefrom. Also, it would be possible by the use of two similar launching prisms in series, such as at 68 and 70, to launch two different pictures and superimpose same upon the image plane. If the two launching prisms 68 and 70 are of different refractive indices, one transmitted image may be vertically disposed with respect to the other.

Stray light absorbing means in the form of opaque transverse baffles 71 and 73 have been shown for preventing unwanted light rays from reaching the receiving prisms and interfering with the transmitted images. Like absorbing means may be in FIGS. 1 and 3, if desired.

In FIG. 8 is shown a diagram having X, Y and Z axes for use in defining design parameters for launching, transmitting and receiving optical images of the character described. Rectangular coordinates $\xi$ and $\eta$ have been introduced in the back focal plane of the collimator. The $\eta$ axis marks the line of intersection of the back focal plane with the central normal plane normal to the substrate or guide plate 15 and containing the optical axis of the collimator 18. Assume that the normals to the faces of the launching prisms be in this normal plane. We will also assume that the ray tracing through the collimator 18 and the telescope 38 may be done by first order ray tracing; that is, with the ray passing through the center of the lens without deviation and that plane waves are produced from a luminous point in the back focal plane of the collimator.

A fixed wavelength of light will now be considered and it will be determined what points in the back focal plane of the collimator can radiate light of this wavelength into the transmitting substrate and at what points at the back focal plane or image plane of the telescope this light can arrive by refraction out of the guide block or substrate. In FIG. 8, the arrow 72 indicates a bundle of parallel rays produced by the luminous point with coordinates $\xi, \eta$ in the back focal plane of the collimator. This bundle makes an angle of incidence $i$ with respect to a normal 74 through the first prism face 13 which prism has an index $n_p$. The surface angle of the prism is $\alpha$, the angle of inclination between the optical axis of the collimator and normal to the substrate surface is $\theta$, while $$\tan \beta \equiv \xi/f, \quad \tan \delta \equiv \eta/f \tag{1}$$

and wherein $f$ is the focal length of the collimator.

The triangle E'C'O' has a right angle at C', the triangle D'C'O' has a right angle at C', and the triangle E'D'C' has a right angle at E'.

It can be shown from these triangles that $$\tan^2 i = \tan^2(\theta - \delta - \alpha) \sec^2 \beta + \tan^2 \beta \tag{2}$$

The triangle O'L'K' has a right angle at L', the triangle O'K'G' in the plane of incidence and refraction has a right angle at G' and triangle O'G'L' in the central normal plane has a right angle at G'. From Snell's Law, it can be shown that $$\sin \beta = n_p \sin \phi \tag{3}$$

and from triangles O'J'H', O'I'G', I'G'H' and O'H'I'

$$\sin \phi = \sin i_p \sin \epsilon \tag{4}$$

Hence:

$$\sin \beta = n_p \sin i_p \sin \epsilon \tag{5}$$

From this Equation 5 and Snell's Law, the lateral magnification will be $$\sin i = n_p \sin r_p \tag{6}$$

wherein $r_p$ is the angle of refraction into the prism.

The law of cosines applied to the triangle O'G'H' shows that $$\cos r_p = \sin i_p \sin \alpha \cos \epsilon + \cos i_p \cos \alpha \tag{7}$$

Finally, the refraction into the substrate is assumed to follow Snell's Law so that $$n_p \sin i_p = n_s \sin r_s \qquad (8)$$

wherein $n_s$ is the refractive index of the substrate and $r_s$ is the angle of refraction of the ray into the substrate.

A condition which must be kept in mind is that $r_s$ cannot exceed arc sin $(n_p^{-1})$, since for any given value for $r_s$ and the indices $n_p$ and $n_s$ there is a minimum value of $\alpha$ which must be exceeded if the ray is to pass into the substrate.

Equations 2, 3, and 5-8 form a unique system of equations for ray tracing only if a unique angle $r_s$ or a very narrow range of angles is used at any one time to form the image. Thus for $\beta=0$ along the $\eta$-axis (the height direction of object) at the back focal plane of the collimator, the system of equations can be solved to yield $$\sin(\theta-\delta-\alpha) = \pm n_s \left\{ \cos\alpha \sin r_s - \sin\alpha \left[ \left(\frac{n_p}{n_s}\right)^2 - \sin^2 r_s \right]^{1/2} \right\} \qquad (9)$$

wherein the plus sign must be used for $(\theta-\delta)>\alpha$, and the minus sign used when $(\theta-\delta)<\alpha$.

Equation 9 can be considered as a relation between the angle $\delta$ which measures distance in the $\eta$-direction of the back focal plane and the wavelength of light which can emerge into the substrate at the angle $r_s$. The $\xi$-axis at the back focal plane will be in the lateral direction thereof.

The important connection between values $\beta$ and $\delta$ and hence between values for $\xi$ and $\eta$ for any given wavelength can be exposed by assigning values to $r_s$ and $\epsilon$ and using Equations 8 through 5, in this order, to get the angles $i$ and $\beta$. Equation 2 solved for $(\theta-\delta-\alpha)$ yields:

$$\tan^2(\theta-\delta-\alpha) = \frac{\sin^2 i - \sin^2 \beta}{1-\sin^2 i} \qquad (10)$$

thus completing the set of equations.

A qualitative description of the connection between $\delta$ and $\lambda$, the wavelength of light 77 which can emerge into the substrate at the angle $r_s$ can be argued directly from Equation 8 in the form $$\sin i_p = n_p^{-1} n_s \sin r_s \qquad (11)$$

Let $\sin r_s$ be constant and recall that for most transparent substances, the refractive index varies with wavelength (becoming smaller for longer wavelengths) and that the higher the index at any given wavelength, the greater is the variation or dispersion.

Since $n_p > n_s$ in Equation 11, the longer wavelengths of light emerging into the substrate at an angle $r_s$ must strike the interface at a larger angle $i_p$. If these rays are traced back to the entrance face of the prism, it will be found that the angle $(\theta-\delta)$ must be larger also. It follows that an image reconstituted from the light in the substrate at an angle $r_s$ will appear as graduated in color from red to blue in the positive direction along the $\eta$-axis. Equation 9 states the exact dependence along the $\eta$-axis of the back focal plane of the collimator.

Some lines of constant color or wavelength for a crown glass substrate and a dense flint launching prism are listed in Tables I(A) and I(B). In this particular example, the angular extent of the field in the $\eta$-direction is about 18 minutes total included angle for visible radiation. If the lateral extent of the field (in the $\xi$-direction) be limited to this value also, the isochromatic lines may be considered straight. However, the curvature of the isochromatic lines will become visible as the lateral dimension of the field is increased. The direction of curvature can be deduced from Equation 10, since the larger is $|\beta|$ the smaller must be $(\theta-\delta-\alpha)$, or, if $\theta$ and $\alpha$ are fixed, the larger must be $\delta$. This leads to a curvature of the isochromatic lines toward the shortest wavelength portion of the image with increase in $|\beta|$.

TABLE I(A).—ISOCHROMATIC LINES FOR A DENSE FLINT PRISM AGAINST A CROWN GLASS SUBSTRATE $r_s = 89°.0000;\ \Theta = \alpha = 60°$

| λ | $n_s$ | $n_p$ | tan β | tan δ | tan β | tan δ | tan β | tan δ | tan β | tan δ | tan β | tan δ |
|---|---|---|---|---|---|---|---|---|---|---|---|---|
| 656.3mμ | 1.52100 | 1.69576 | 0 | −0.111339 | 0.002654 | −0.111336 | 0.005309 | −0.111335 | 0.007963 | −0.111330 | 0.010618 | −0.111325 |
| 589.3 | 1.52400 | 1.70006 | 0 | −0.109776 | 0.002659 | −0.109775 | 0.005319 | −0.109772 | 0.007979 | −0.109768 | 0.010639 | −0.109763 |
| 546.1 | 1.52655 | 1.70359 | 0 | −0.108482 | 0.002664 | −0.108482 | 0.005328 | −0.108481 | 0.007992 | −0.108477 | 0.010656 | −0.108472 |
| 486.1 | 1.53127 | 1.71033 | 0 | −0.105904 | 0.002672 | −0.105904 | 0.005345 | −0.105903 | 0.008017 | −0.105899 | 0.010689 | −0.105894 |
| 435.9 | 1.53702 | 1.71844 | 0 | −0.102982 | 0.002682 | −0.102979 | 0.005365 | −0.102978 | 0.008047 | −0.102974 | 0.010729 | −0.102970 |

TABLE I(B)

$r_s = 89°.9000;\ \Theta = \alpha = 60°$

| λ | $n_s$ | $n_p$ | β | tan δ | δ |
|---|---|---|---|---|---|
| 656.3 mμ | 1.52100 | 1.69576 | 0° | −0.111865 | −6°.3829 |
| 589.3 | 1.52400 | 1.70000 | 0° | −0.110305 | −6°.2945 |
| 546.1 | 1.52655 | 1.70359 | 0° | −0.109009 | −6°.2212 |
| 486.1 | 1.53127 | 1.71033 | 0° | −0.106432 | −6°.0753 |
| 435.9 | 1.53702 | 1.71844 | 0° | −0.103505 | −5°.9094 |

A comparison of Table I(A) and I(B) shows that the angular extent of the field of view in the $\eta$-direction is practically independent of the angle $r_s$ at least for $r_s > 89°$.

The path followed by the light after refraction into the substrate cannot be described by simple ray tracing if the substrate has a refractive index which decreases as a function of its distance below the surface. For example, let it be supposed that a ray is refracted into the substrate at an angle $r_s$ at the surface wherein the index is $n_s$. As the ray penetrates below the surface, it would deviate so as to make a smaller and smaller angle with respect to the planes of constant index in the substrate. When the ray becomes parallel to such a plane, it would continue to propagate in that plane. Thus, a beam of parallel rays would be found to arrive at its destination in this plane with vanishing cross-section and, therefore, infinite intensity. Such a condition violates the assumptions under which ray tracing is a good approximation. The surface wave method of description holds more promise for analyzing the experimental facts already obtained on the optical energy which herein has been termed surface-guided optical waves.

Design parameters for receiving the energy which has been launched into the substrate at an angle $r_s$ can be based on the following experimental facts:

(1) The light which enters the substrate at an angle $$\epsilon = \arcsin\left[\frac{\sin \beta}{n_p \sin i_p}\right] \qquad (12)$$

with respect to the central normal plane will propagate in the substrate in such a manner as to maintain that angle. Thus, if the entire width (considered in a direction perpendicular to the plane of the drawings in FIG. 1) of the launching surface of the launching prism is to be used, a prism of greater width for the receiving surface or base must be used if no vignetting is to occur at this surface.

(2) The light which is collected by the receiving prism intersects the surface of the substrate again at the same angle $r_s$ that it had upon refraction into the substrate.

(3) The angle $\bar{r}_s$ for which maximum energy transmission occurs depends upon the separation of the launching and receiving prisms; the greater the separation, the smaller is $\bar{r}_s$, and if a range (which can be quite small) of angle $\bar{r}_s$ exists at the launching prism, the entire base of the receiving prism can be illuminated.

The receiving prism and the receiving telescope operate in a reverse order from that at the launching station, picking up the radiation in the substrate at the angle $r_s$ and refracting it out through the receiving prism of index $n'_p$ (or $n_p$ as used in FIG. 1) and into the telescope of focal length $f'$. The foregoing Equations 1–11 with proper substitution of primed quantities can be applied here. The coordinate system in the back focal plane of the receiving telescope must be reflected in the central normal plane so that $\xi'$ is in a direction opposite to $\xi$ as one looks against the light in the system. These conventions and the principles stated above concerning the light path into the substrate lead to the following results:

The magnification of the entire image transfer system in the direction of the $\xi'$-axis depends only on the ratio $f'/f$, the focal length of the receiving telescope to the focal length of the collimator. From Equations 5 and 8 we can write $$\sin \beta' = (n'_p \sin i'_p) \sin \epsilon' = (n_p \sin i_p) \sin \epsilon = \sin \beta \quad (13)$$

The lateral angular magnification is unity regardless of the base angles $\alpha$ and $\alpha'$ and the indices $n_p$ and $n'_p$ of the prisms.

The magnification of the image transfer system along the $\eta'$-axis may be found by solving the two following equations simultaneously:

$$\sin(\theta - \delta - \alpha) = \pm n_s \left\{ \cos\alpha \sin r_s - \sin\alpha' \left[ \left(\frac{n_p}{n_s}\right)^2 - \sin^2 r_s \right]^{1/2} \right\} \quad (14)$$

$$\sin(\theta' - \delta' - \alpha') = \pm n_s \left\{ \cos\alpha' \sin r_s - \sin\alpha' \left[ \left(\frac{n'_p}{n_s}\right)^2 - \sin^2 r_s \right]^{1/2} \right\} \quad (15)$$

and wherein the primed quantities are the counterparts in the receiving structure of the unprimed quantities in the launching structure.

While Equations 14 and 15 are complicated, they lead, in general, to non-linear magnification except for small fields of view. This is shown by the following examples. With the system symmetrical and thus $\theta = \theta'$, $\alpha = \alpha'$ and $n_p = n'_p$ the angular magnification is unity and the linear magnification is just the ratio of the focal lengths $f$ and $f'$. However, if we have $n_p = n'_p$ but $\alpha' < \alpha$ and let the index $n_p$ and angle $\alpha$ be so chosen that the light from the collimator falls at an angle such that $(\theta - \delta) > \alpha$ as in FIG. 8, then since $i'_p = i'_p$, $r'_p + \alpha' = r_p + \alpha$ we have:

$$\left. \begin{array}{l} \sin i' = n_p \sin r'_p \\ \sin i = n_p \sin r_p \end{array} \right\} \quad (16)$$

It can be deduced that if $\alpha' < \alpha$, then $r' > r_p$ but the change in $r'_p$ equals the change in $r_p$ when the wavelength $\lambda$ is changed. It follows from Equation 16 that the angular variation in $i'$ is not as great as the variation in $i$ as a function of $\lambda$. This combination of prims thus demagnifies the image in the $\eta'$ direction. The results of such a system are shown in Table II(A) which follows:

$n_p = n'_p; \theta = \alpha = 60°; \alpha' = 50°; \theta' = 57°.4781; r_s = 89°.9000; \beta = 0$

| λ | $n_s$ | $n_p$ | δ | δ' |
|---|---|---|---|---|
| 656.3mμ | 1.52100 | 1.69576 | −6°.3829 | −6°.3075 |
| 589.3 | 1.52400 | 1.70000 | −6°.2945 | −6°.2603 |
| 546.1 | 1.52655 | 1.70359 | −6°.2212 | −6°.2212 |
| 486.1 | 1.53127 | 1.71033 | −6°.0753 | −6°.1409 |
| 435.9 | 1.53702 | 1.71844 | −5°.9095 | −6°.0539 |

Another example is as follows: Let $\alpha' = \alpha$ and $n'_p < n_p$. Also let the index $n_p$ and the angle $\alpha$ be chosen so that $(\theta - \delta) > \alpha$ as in FIG. 8. Because $$n'_p \sin i'_p = n_p \sin i_p \quad (17)$$

$i'_p$ will be larger than $i_p$. The relation we have assumed between $n_p$ and $\alpha$ requires that $\alpha + r_p = i_p$. Let us now assume in addition that the relation between $\alpha$ and $n'_p$ will be such that $\alpha + r'_p = i'_p$. Then $r_p < r'_p$. However, the changes in $r_p$ and $r'_p$ with changes in wavelength are equal and since $$\left. \begin{array}{l} \sin i = n_p \sin r_p \\ \sin i' = n'_p \sin r'_p \end{array} \right\} \quad (18)$$

the angular variation in $i'$ will be smaller than that in $i$ as the wavelength is changed. This combination of prisms demagnifies the image in the $\eta'$ direction. The typical calculations of such a system are given by Table II(B) which follows:

$n'_p < n_p; \theta = \alpha' = 60°; \alpha = 60°; \theta' = 63°.5340; r_s = 89°.9000; \beta = 0$

| λ | $n_s$ | $n_p$ | $n'_p$ | δ | δ' |
|---|---|---|---|---|---|
| 656.3mμ | 1.52100 | 1.69576 | 1.66585 | −6°.3829 | −6°.3752 |
| 589.3 | 1.52400 | 1.70000 | 1.67000 | −6°.2945 | −6°.2890 |
| 546.1 | 1.52655 | 1.70359 | 1.67348 | −6°.2212 | −6°.2212 |
| 486.1 | 1.53127 | 1.71033 | 1.68004 | −6°.0753 | −6°.0817 |
| 435.9 | 1.53702 | 1.71844 | 1.68801 | −5°.9095 | −5°.9155 |

If the prims of different indices but equal angles $\alpha$ are interchanged so that $n'_p > n_p$, then the system will magnify the image.

FIG. 9(A) shows how a test object (such as crossed arrows) would appear as viewed looking against the light (white light) and at the back of focal plane 26 of the launching telescope.

The image thereof as viewed by eye through the exit prism is inverted and colored, as indicated in FIG. 9(B), the shortest wavelengths (blue) emanating at the greater angle with respect to the plane of the substrate, and thus that portion of the image appearing nearest the substrate will be formed by the shorter wavelengths. The image viewed through the receiving telescope is erect but reflected in the reverse order so that its color is as indicated in FIG. 9(C) with that portion of the image nearest the substrate being formed by the longer (red) wavelengths.

We claim:

1. An optical system for transmitting two-dimensional optical images from a first location to a second location materially spaced therefrom, said system comprising a guide plate having an elongated optically finished exterior guide surface thereon, said guide plate being formed of a transparent material having a given refractive index at said optically finished exterior guide surface and an appreciable gradient in refractive indices of lesser values at locations progressively slightly inwardly thereof, a launching prism and a receiving prism each having a pair of entrance and exit faces formed thereon, and each pair having an included angle of predetermined value therebetween, said launching prism having its exit face and said receiving prism having its entrance face disposed in optical contact and aligned relation with said guide surface at said first and second spaced locations, respectively, said launching prism having a higher predetermined refractive index than the refractive index of said guide surface, a film gate having an aperture of predetermined height and width disposed in said system so as to position photographic film, or the like, at a first focal plane of said system, means for illuminating said film gate, a collimating lens aligned with said film gate and with the entrance face of said launching prism, and having a principal focus substantially at the plane of said film gate, said collimating lens being so positioned in said optical system in accordance with the difference in refractive indices at the interface between said launching prism and said guide surface as to direct parallel light rays from said film gate aperture through said interface and into said guide plate substantially at critical angle and so as to travel longitudinally within said plate closely adjacent said guide surface as lower order modes of surface-guided optical waves at relatively high light intensity, said surface-guided optical waves being such as to tenaciously follow said guide surface even though said guide surface may twist or turn appreciably intermediate said first and second locations, said receiving prism having a higher predetermined refractive index than said guide surface and serving to extract parallel light rays substantially at critical angle therefrom, and a receiving telescope disposed in aligned relation to the exit face of said receiving prism so as to collect the parallel light rays passing outwardly through said receiving prism and focus same as a two-dimensional image of said film gate aperture substantially at an image plane of said system, and wherein a second apertured film gate, collimating lens and launching prism of higher predetermined refractive index than said guide surface are positioned in said system with said second launching prism disposed in optical contact with and in aligned relation to said guide surface adjacent said first location.

2. The combination defined in claim 1 and wherein said second launching prism has a higher predetermined refractive index than said first launching prism.

3. An optical system for transmitting two-dimensional optical images from a first location to a second location materially spaced therefrom, said system comprising a guide plate having an elongated optically finished exterior guide surface thereon, said guide plate being formed of a transparent material having a given refractive index at said optically finished exterior guide surface and an appreciable gradient in refractive indices of lesser values at locations progressively slightly inwardly thereof, a launching prism and a receiving prism each having a pair of entrance and exit faces formed thereon, and each pair having an included angle of predetermined value therebetween, said launching prism having its exit face and said receiving prism having its entrance face disposed in optical contact and aligned relation with said guide surface at said first and second spaced locations, respectively, said launching prism having a higher predetermined refractive index than the refractive index of said guide surface, a film gate having an aperture of predetermined height and width disposed in said system so as to position photographic film, or the like, at a first focal plane of said system, means for illuminating said film gate, a collimating lens aligned with said film gate and with the entrance face of said launching prism, and having a principal focus substantially at the plane of said film gate, said collimating lens being so positioned in said optical system in accordance with the difference in refractive indices at the interface between said launching prism and said guide surface as to direct parallel light rays from said film gate aperture through said interface and into said guide plate substantially at critical angle and so as to travel longitudinally within said plate closely adjacent said guide surface as lower order modes of surface-guided optical waves at relatively high light intensity, said surface-guided optical waves being such as to tenaciously follow said guide surface even though said guide surface may twist or turn appreciably intermediate said first and second locations, said receiving prism having a higher predetermined refractive index than said guide surface and serving to extract parallel light rays substantially at critical angle therefrom, and a receiving telescope disposed in aligned relation to the exit face of said receiving prism so as to collect the parallel light rays passing outwardly through said receiving prism and focus same as a two-dimensional image of said film gate aperture substantially at an image plane of said system, and wherein a second receiving prism having a higher predetermined refractive index than said guide surface, an aligned telescope and an image plane are provided in said system adjacent said second location and with said second receiving prism disposed in optical contact with and aligned relation to the guide surface in contact therewith.

4. The combination defined in claim 3 and wherein said second receiving prism has a higher predetermined refractive index than said first receiving prism.

References Cited

UNITED STATES PATENTS 3,295,911  1/1967  Ashkin et al.

OTHER REFERENCES

Alcogue et al., "Sur l'Onde de Reflexion Totale," Comptes Rendus, vol. 250, June 1960, pp. 4328–4330.

JOHN K. CORBIN, Primary Examiner

U.S. Cl. X.R.

350—96